US012722352B2

(12) United States Patent
Saracino et al.

(10) Patent No.: US 12,722,352 B2
(45) Date of Patent: Sep. 1, 2026

(54) TABLET PRESS MACHINE AND METHOD FOR REJECTING AND SAMPLING TABLETS

(71) Applicant: I.M.A. INDUSTRIA MACCHINE AUTOMATICHE S.P.A., Ozzano dell'Emilia (IT)

(72) Inventors: Fabio Saracino, Ozzano dell'Emilia (IT); Filippo Zaniboni, Ozzano dell'Emilia (IT); Salvatore Fabrizio Consoli, Ozzano dell'Emilia (IT)

(73) Assignee: I.M.A. INDUSTRIA MACCHINE AUTOMATICHE S.P.A., Ozzano dell'emilia (IT)

( * ) Notice: Subject to any disclaimer, the term of this patent is extended or adjusted under 35 U.S.C. 154(b) by 71 days.

(21) Appl. No.: 18/834,734

(22) PCT Filed: Feb. 13, 2023

(86) PCT No.: PCT/IB2023/051290

§ 371 (c)(1),
(2) Date: Jul. 31, 2024

(87) PCT Pub. No.: WO2023/156896

PCT Pub. Date: Aug. 24, 2023

(65) Prior Publication Data

US 2025/0144905 A1 May 8, 2025

(30) Foreign Application Priority Data

Feb. 15, 2022 (IT) ........................ 102022000002702

(51) Int. Cl.
*B30B 15/32* (2006.01)
*B30B 11/00* (2006.01)
*B30B 11/08* (2006.01)

(52) U.S. Cl.
CPC ............ *B30B 11/005* (2013.01); *B30B 11/08* (2013.01); *B30B 15/32* (2013.01)

(58) Field of Classification Search
None
See application file for complete search history.

(56) References Cited

U.S. PATENT DOCUMENTS

2006/0171577 A1 8/2006 Schmidt et al.
2010/0094449 A1* 4/2010 Boeckx .................. B30B 15/32 700/282

(Continued)

FOREIGN PATENT DOCUMENTS

JP 10-263896 10/1998
KR 10-1246138 4/2013

OTHER PUBLICATIONS

International Search Report (ISR) issued Jun. 5, 2023 in International (PCT) Application No. PCT/IB2023/051290.

(Continued)

*Primary Examiner* — Yung-Sheng M Tsui
(74) *Attorney, Agent, or Firm* — Wenderoth, Lind & Ponack, L.L.P.

(57) ABSTRACT

A rotary tablet press machine includes a compression turret rotating about a rotation axis and including a die table with dies arranged to receive a product to be compressed to make tablets, a conveying system for conveying the tablets into an outlet duct, and a reject and sampling system configured to selectively divert established tablets made by the dies into a reject duct or into a sampling duct. The reject and sampling system includes a first diverting device configured to operate on single tablets to be rejected so as to divert them from the die table towards the reject duct and a second diverting device configured to operate on single tablets to be sampled so as to divert them from the die table towards the sampling (Continued)

duct. The first and second diverting devices are configured to operate on the tablets before the tablets have left the die table.

16 Claims, 1 Drawing Sheet

(56) References Cited

U.S. PATENT DOCUMENTS

| | | | | |
|---|---|---|---|---|
| 2017/0080662 | A1* | 3/2017 | Carstens | B07C 5/18 |
| 2017/0210043 | A1* | 7/2017 | Arning | B30B 11/005 |
| 2020/0316895 | A1* | 10/2020 | Kolbe | B30B 15/02 |
| 2021/0129475 | A1* | 5/2021 | Carstens | B29C 37/0003 |
| 2021/0154959 | A1* | 5/2021 | Carstens | B30B 11/08 |
| 2021/0221085 | A1* | 7/2021 | Klaer | B30B 15/32 |
| 2021/0370632 | A1* | 12/2021 | Luedemann | B30B 15/30 |

OTHER PUBLICATIONS

Request for the Submission of an Opinion issued Jun. 10, 2026 in corresponding Korean Application No. 10-2024-7030977, with English machine translation.

* cited by examiner

TABLET PRESS MACHINE AND METHOD FOR REJECTING AND SAMPLING TABLETS

The present invention relates to press machines suitable for producing tablets, lozenges, and pills for pharmaceutical use, food use, and chemical use and in particular to a rotary press machine provided with a system for rejecting or sampling the tablets manufactured. The invention also relates to a method for rejecting or sampling tablets manufactured in a press machine.

The known rotary press machines comprise a compression turret, rotating about a vertical axis and formed by a die table or plate provided with a plurality of dies, i.e., through cavities, angularly distributed, equidistant from each other, along a circumferential portion of the same table and arranged to receive a powdered or granular product dispensed in a dedicated dosing station. The turret further comprises a plurality of upper punches and lower punches associated in pairs with the respective dies and moved linearly and vertically, coaxially to the dies, by cams and compression rollers during the rotation of the turret.

The lower punches form with the dies suitable seats or dosing chambers able to receive in the dosing station the product to be compressed.

In a subsequent compression station the upper punches and lower punches are moved by compression rollers in order to compress the product introduced into the dies so as to create the tablets, which are then extracted from the dies of the table by means of the lower punches, suitably lifted, and therefore conveyed in an outlet chute corresponding to an outlet station.

The various tablet manufacturing steps are performed during a revolution rotation of the compression turret which rotates with generally continuous motion.

At the outlet chute, a reject system is usually provided that diverts the tablets manufactured that do not meet the production requirements, among which size, hardness, porosity and weight, into an appropriate reject duct. These parameters are detected, for example, by measuring a compressive force exerted by the punches in the single dies or a height of the product dosed inside the dies or the mass of the tablets by means of microwave sensors or based on magnetic resonance technology or by directly measuring the weight of the tablets by means of electronic scales or load cells.

The reject system typically comprises a movable diverting element, mechanically movable by an electrical or pneumatic actuator into an operative position in order to divert the tablets to be rejected into the reject duct; the regular tablets are instead conveyed into a main duct of the aforementioned outlet chute.

Likewise the known press machines may comprise, generally at said outlet chute, a sampling system intended to divert a group or sample of manufactured tablets into a sampling duct, for example to undergo thorough examinations and extensive quality controls.

For this purpose, the sampling system comprises a respective movable diverting element, mechanically movable by an electric or pneumatic actuator in an operative position to divert the tablets to be sampled into the appropriate duct.

A disadvantage of the known reject systems and sampling systems lies in that at high operating speeds of the press tablet machine (i.e. at high rotation speeds of the compression turret) they allow respectively a reject and sampling of cumulative type, i.e. the reject and sampling of a plurality of tablets in succession, since the low speed of mechanical actuation of the movable diverting elements does not allow the diverting elements to select and divert the tablets singly, i.e. to perform a so-called single reject and a sampling.

The single type sampling is, however, very useful and important because it allows, for example, t tp sample and subsequently to analyse only specific tablets exiting from the press machine, for example those manufactured by a specific pair of punches of the plurality of pairs of punches (upper and lower), typically in order to verify the correct operation of said specific pair of punches.

US 2010/094449 discloses a system for rejecting tablets manufactured in a rotary press machine which comprises an ejection nozzle for separating defective tablets. The ejection nozzle is fed with compressed gas through a supply line having an inlet end for connection with a source of compressed gas and an outlet end communicating with the ejection nozzle.

The supply line is equipped with a control valve that is controlled by a control unit in order to open the supply line when a defective tablet has been detected by the control unit. The supply line is equipped with a sensor positioned between the control valve and the inlet end of the supply line and suitable for detecting a parameter indicative of a gas flow through the control valve so that the control unit generates an error signal in case of malfunction of the control valve.

US 2017/080662 discloses a rotary tablet press machine, having a table rotatable about a vertical rotation axis and provided with a die with holes for producing tablets within said holes by means of pairs of punches. The press machine comprises at least one filling station, having at least one pressing station and having at least one tablet outlet for extracting the tablets manufactured by the rotary press machine. A rejecting device is associated to the outlet by means of which the tablets, according to a control signal, can be supplied as single tablets to a first channel or as a flow of tablets to a second channel. To allow an increase in production at the outlet, a weighing device is associated with a weighing cell, wherein the tablets of the first channel can be fed to the weighing device via a supply channel.

US 2021/221085 discloses a reject chute for a machine for making tablets and a method for selecting the tablets after they have been made in the machine for making tablets. The reject chute comprises channels in which the tablets are guided and/or sorted after their production which are arranged on two planes. Sorting of the tablets is carried out by means of sorting devices arranged in tandem. A sorting device comprises two bars which are preferably designated as sorting bars and as separating bars. The sorting bar comprises a linear drive, which is connected by an oscillating lever to the separating bar. If the sorting bar moves upward from the rest position to the sorting position, the separating bar automatically descends downward and releases the opening of the sorting channel.

It is an object of the present invention to improve known tablet press machines, in particular rotary press machines provided with systems for rejecting and sampling the tablets manufactured.

A further object is to provide a press machine that selectively allows the manufactured tablets to be singly rejected or sampled precisely and accurately, in particular in order to perform single reject and sampling.

A further object is to provide a press machine provided with an efficient and precise reject and sampling system and that is at the same time simple and economical to construct.

Yet another object is to provide a method for rejecting and sampling tablets manufactured in a press machine, in particular for selectively rejecting or precisely and accurately sampling singly manufactured tablets so as to achieve single reject and sampling.

A first aspect of the invention provides a tablet press machine according to claim 1.

A second aspect of the invention provides a method for rejecting and sampling the tablets in a press machine according to claim 7.

The invention can be better understood and implemented with reference to the attached drawings which illustrate an exemplary and non-limiting embodiment thereof, in which.

Figure 2:
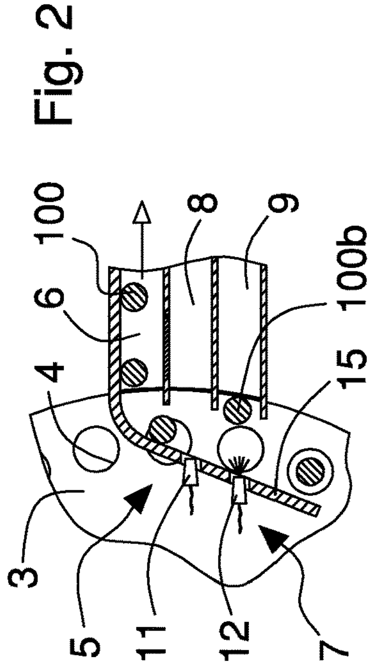
FIG. 2 is a partial plan view of the press machine of FIG. 1 illustrating the reject and sampling system in a sampling configuration.
Figure 3:
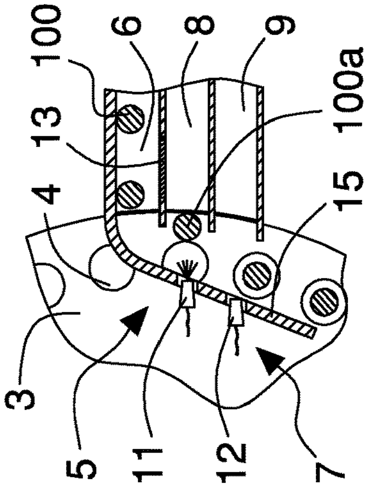
FIG. 3 is a partial plan view of the press machine of FIG. 1 illustrating the reject and sampling system in a reject configuration.
Figure 4:
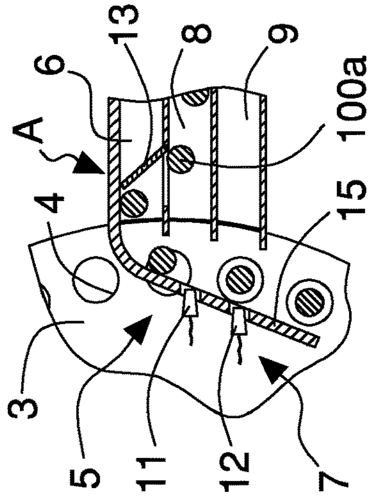
FIG. 4 is a partial plan view of the press machine of FIG. 1 illustrating the reject and sampling system in a reject configuration in an initial adjustment step of the press machine.
Figure 1:
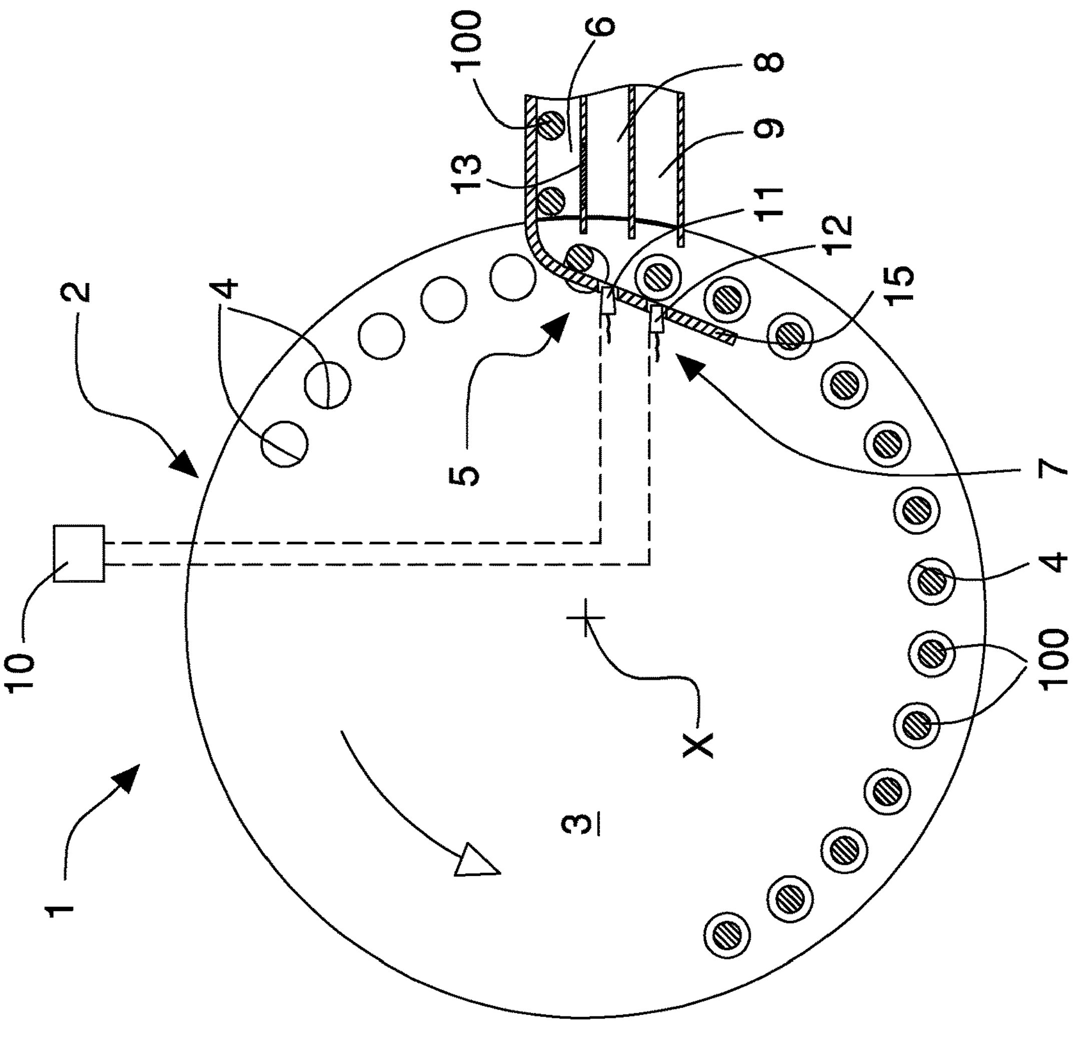
FIG. 1 is a schematic and simplified plan view of the rotary tablet press machine of the invention, provided with a reject and sampling system for the manufactured tablets, arranged in a production configuration.

Referring to FIGS. 1 to 4, the rotary tablet press machine 1 according to the invention is schematically illustrated which comprises a compression turret 2 rotating about a rotation axis X, in particular vertical, and including a die table 3 provided with a plurality of dies 4, or through cavities, arranged to receive a product to be compressed and to make tablets 100.

The dies 4 are carried out along a circumferential portion of the die table 3, angularly spaced apart from each other.

The press machine 1 further comprises a plurality of lower punches and upper punches, which are not illustrated because of a known type, associated in pairs to respective dies and a dosing station adapted to fill with a product the dosing cavities formed by the dies 4 closed below by the lower punches. Drive means, for example of the cam type, are provided to move the lower punches and/or the upper punches within the respective dies 4 in order to compress the product and obtain the tablets.

The press machine 1 also comprises conveying means 5 for conveying the tablets 100 made by the dies 4 of the die table 3 into an outlet duct 6, and a reject and sampling system 7 configured to divert established tablets 100 made by the dies 4 selectively into a reject duct 8 or into a sampling duct 9.

In particular, the reject and sampling system 7 comprises first diverting means 11 configured to act on single tablets to be rejected 100*a* so as to divert them from the die table 3 towards the reject duct 8, and second diverting means 12, distinguished from the first diverting means 11 and configured to operate on individual tablets to be sampled 100*b* so as to divert them from the die table 3 towards the sampling duct 9. More precisely, the first and second diverting means 11, 12 are configured to operate on a single tablet at a time so as to carry out a reject or a sampling of the single tablets.

In the embodiment shown in the figures, the first diverting means 11 and the second diverting means 12 comprise respective compressed air supply devices, of known type, suitable for emitting respective compressed air blows or jets capable of hitting and diverting a single tablet to be rejected 100*a* or a single tablet to be sampled 100*b* at a time, when extracted from the respective die 4 of the die table 3.

The outlet duct 6, which receives the tablets 100 extracted from the dies 4 (for example by suitably raising the lower punches), is arranged for example almost radially with respect to the die table 3.

The conveying means 5 comprise a shaped and curved guide element 15 configured to be abutted by the tablets 100 that are extracted from the dies 4 and slide on an upper surface of the die table 4 so as to divert them into the outlet duct 6.

The reject duct 8 and the sampling duct 9 are arranged side by side and parallel to the outlet duct 6 and depart from the die table 3. The reject duct 8 is for example interposed between the sampling duct 9 and the outlet duct 6. The reject and sampling ducts 8, 9 and the outlet duct 6 are inclined downwards for example to allow the tablets to descend and slide easily by gravity.

The first diverting means 11 are arranged above the die table 3, upstream of the outlet duct 6, with reference to a advancement direction of tablets exiting from the dies 4, and in particular they face the mouth of the reject duct 8 so as to singly divert the tablets to be rejected 100*a* extracted from the dies 4 and push them into the reject duct 8.

Similarly, the second diverting means 12 are arranged above the die table 3, upstream of the outlet duct 6, and in particular they face the mouth of the sampling duct 9 so as to singly divert the tablets to be sampled 100*b* extracted from the dies 4 and push them into the sampling duct 9.

In particular, the second diverting means 12 are arranged on the die table 3 upstream of the first diverting means 11 with respect to the advancement direction of tablets.

The press machine 1 may also comprise sensor means arranged adjacent to the first diverting means 11 and the second diverting means 12 and configured to detect the passage, in particular the presence, of a tablet 100 in front of the first diverting means 11 and of the second diverting means 12.

A control unit 10 is provided that is connected to the first diverting means 11 and to the second diverting means 12 and is configured to selectively activate the diverting means 11 or the second diverting means 12 respectively when the tablet to be rejected or to be sampled is on the die table 3 and arrives in front of the first diverting means 11 or of the second diverting means 12 respectively.

The control unit 10 is, for example, the control unit that controls the operation of the whole press machine 1. For example, the control unit 10 can be connected to sensor means suitable for detecting a compressive force exerted by the punches inside the dies 4 and/or suitable for detecting other parameters of the tablets 100, such as size, hardness, porosity and weight that allow the control unit 10 to identify the manufactured tablets 100 that do not meet the production requirements, i.e. the tablets to be rejected 100*a*.

In particular, the control unit 10 identifies the tablets to be rejected 100*a* and the dies 4 of the die table 3 in which they are housed so as to identify such tablets when exiting the die table 3 and allow the reject and sampling system 7 to divert said tablets into the reject duct 8 or into the sampling duct 9.

The reject and sampling system 7 also comprises third diverting means 13 configured to divert an established plurality of tablets to be rejected 100*a* from the outlet duct 6 towards the reject duct 8, for example in an initial step of adjustment of the press machine 1 in which the tablets manufactured do not yet meet the production requirements.

The third diverting means 13 comprise, for example, a diverting element that can be moved in an operative position A in order to divert the established plurality of tablets to be rejected 100*a* from the outlet duct 6 to the reject duct 8. In particular, the diverting element 13 is inserted in a wall that separates the outlet duct 6 from the reject duct 8 and is rotated in the operative position A, in which it is inserted within the outlet duct 6 so as to intercept and divert the tablets to be rejected 100*a* which slide inside it.

The diverting element 13 is rotated by drive means of known type and not illustrated, for example electric or pneumatic drive means.

The operation of the rotary press machine 1 of the invention comprises extracting the tablets 100 from the dies 4 of the die table 3 and conveying them by means of the guide element 15 of the conveying means 5 into the outlet duct 6.

When a tablet to be rejected 100*a,* saved by the control unit 10 and extracted by the respective die 4, moves on the die table 3 in front of the first diverting means 11, the first diverting means are activated by the control unit 10 to divert and push the aforementioned tablet to be rejected into the reject duct 8.

Similarly, when a tablet to be sampled 100*b,* saved by the control unit 10 and extracted from the respective die 4, moves on the die table 3 in front of the second diverting means 12, the second diverting means are activated to divert and push the aforementioned tablet to be sampled 100*b* into the sampling duct 9.

It should be noted that the first diverting means 11 and the second diverting means 12 operate on the tablets 100 before they have left the die table 3.

The press machine 1 of the invention thus selectively allows the manufactured tablets to be rejected or sampled individually, in particular in order to perform a single reject and sampling.

More precisely, thanks to the use of diverting means 11, 12, in particular the pneumatic type blowing compressed air, a simple and economical reject and sampling system 7 is carried out, capable to operate on a single tablet at a time so as to perform in a precise and reliable way a single reject and sampling of the tablets 100 even at high operating speeds of the press machine 1.

In the case of sampling it is therefore possible to select and sample only established tablets, even if they are separated from each other in the die table 3 by other tablets not be sampled.

For example, it is possible to sample all and only the tablets manufactured by a specific pair of compression punches to accurately and precisely control their operation.

The method of the invention for rejecting and sampling tablets, pills, lozenges and the like manufactured in a press machine 1 comprises the following steps:

conveying tablets 100 manufactured by die 4 of a die table 3 of a compression turret 2 of the press machine 1 into an outlet duct 6;

singly diverting tablets to be rejected 100*a* made by the dies 4 from the die table 3 towards a reject duct 8 by means of first diverting means 11;

singly diverting tablets to be sampled 100*b* made by the dies 4 from the die table 3 towards a sampling duct 9 by means of second diverting means 12 which are distinct from the first diverting means 11;

wherein the first and second diverting means 11, 12 operate on the tablets 100 before they have left the die table 3.

The step of diverting a single tablet to be rejected 100*a* is carried out by means of a jet of compressed air emitted by the first diverting means 11.

The step of diverting a single tablet to be sampled 100*b* is carried out by means of a jet of compressed air emitted by the second diverting means 12.

According to the method, the steps of diverting the single tablet to be rejected 100*a* or the single tablet to be sampled 100*b* are carried out respectively when the tablet to be rejected or to be sampled is on the die table 3 and arrives in front of the first diverting means 11 or of the second diverting means 12, respectively.

The method further comprises diverting a plurality of tablets to be rejected 100*a* from the outlet duct 6 towards the reject duct 8, in particular in an initial step of adjustment of the press machine 1, by means of third diverting means 13 thereof.

In particular, it is provided to divert the plurality of tablets to be rejected 100*a* from the outlet duct 6 to the reject duct 8 by means of a diverting element of the third diverting means 13.

The method of the invention therefore allows tablets made by and extracted from the die table 3 of the press machine 1 to be selectively and singly rejected or sampled in a precise and accurate manner so as to achieve a single reject and sampling.

The invention claimed is:

1. A rotary tablet press machine comprising:

a compression turret rotatable about a rotation axis and including a die table having a plurality of dies each configured to receive a product to be compressed and to form tablets;

a conveying element configured to convey tablets formed by the dies from the die table into an outlet duct; and a reject and sampling system configured to selectively divert tablets form by the dies into a reject duct or into a sampling duct;

the reject and sampling system comprising:

(i) a first diverting device configured to operate on individual tablets designated for rejection so as to divert the individual tablets from the die table towards the reject duct; and (ii) a second diverting device, distinct from the first diverting device, configured to operate on individual tablets designated for sampling so as to divert the individual tablets from the die table towards the sampling duct, wherein the first and second diverting devices are configured to operate on the tablets while the tablets remain on the die table and before the tablets reach the conveying element, and wherein the conveying element conveys tablets not diverted by the first or second diverting into the outlet duct.

2. The rotary tablet press machine according to claim 1, wherein the first diverting device and the second diverting device each comprise a respective compressed air supply device configured to emit a compressed air blow directed toward a corresponding tablet while the tablet remains on the die table, the compressed air blow being effective to laterally displace and divert only one tablet at a time toward the reject duct or the sampling duct, respectively.

3. The rotary tablet press machine according to claim 1, further comprising a control unit operatively connected to at least the first diverting device and the second diverting device, the control unit being configured to activate the first diverting device or the second diverting device in synchronism with rotation of the die table when a tablet designated for rejection or for sampling is positioned on the die table and is positioned in front of the first diverting device or the second diverting device, respectively.

4. The rotary tablet press machine according to claim 1, wherein the reject and sampling system further comprises a third diverting device arranged downstream of the die table and configured to divert a predetermined plurality of tablets designated for rejection from the outlet duct towards the reject duct.

5. The rotary tablet press machine according to claim 4, wherein the third diverting device comprises a diverting element movable between a non-operative position and an operative position, the diverting element being configured, when in the operative position, to divert the predetermined plurality of tablets designated for rejection from the outlet duct to the reject duct.

6. The rotary tablet press machine according to claim 1, wherein the reject duct and the sampling duct are arranged side by side and extend substantially parallel to the outlet duct, the reject duct and the sampling duct extending away from the die table.

7. The rotary tablet press machine according to claim 1, wherein the first and second diverting devices are positioned above the die table and upstream of the outlet duct relative to a rotational path of the die table.

8. The rotary tablet machine according to claim 1, wherein the second diverting device is positioned on the die table upstream of the first diverting device relative to a rotational path of the die table.

9. A method for rejecting and sampling tablets, pills, lozenges and the like produced in a rotary tablet press machine, the method comprising the steps of:

conveying tablets formed by dies on a die table of a compression turret of the rotary tablet press machine into an outlet duct using a conveying element;

diverting tablets designated for rejection from the die table towards a reject duct using a first diverting device;

diverting tablets designated for sampling from the die table towards a sampling duct using a second diverting device, distinct from the first diverting device;

wherein the first and second diverting devices operate on the tablets while the tablets remain on the die table and before the tablets reach the conveying element, and wherein tablets not diverted by the first or second diverting devices proceed to the conveying element and are conveyed into the outlet duct.

10. The method according to claim 9, wherein the step of diverting a tablet designated for rejection is carried out by a compressed air blow emitted by the first diverting device while the tablet remains on the die table.

11. The method according to claim 9, wherein the step of diverting a tablet designated for sampling is carried out by a compressed air blow emitted by the second diverting device while the tablet remains on the die table.

12. The method according to claim 9, wherein the steps of diverting a tablet designated for rejection or a tablet designated for sampling are carried out, respectively, when the tablet remains on the die table and positioned in front of the first diverting device or the second diverting device, respectively.

13. The method according to claim 9, further comprising diverting a predetermined plurality of tablets designated for rejection from the outlet duct towards the reject duct usingby means of a third diverting device.

14. The method according to claim 13, wherein the step of, diverting a predetermined plurality of tablets designated for rejection from the outlet duct towards the reject duct is carried out during an initial adjustment operation of the rotary tablet press machine.

15. The rotary tablet machine according to claim 1, wherein the reject and sampling system is positioned upstream of the conveying element along a rotational path of the die table.

16. The method according to claim 9, wherein the steps of diverting tablets designated for rejection or sampling are carried out before the tablets reach the conveying element along a rotational path of the die table.

* * * * *